Aug. 24, 1954     E. J. HUNTER     2,687,329
IRRIGATION HOSE
Filed Nov. 22, 1952
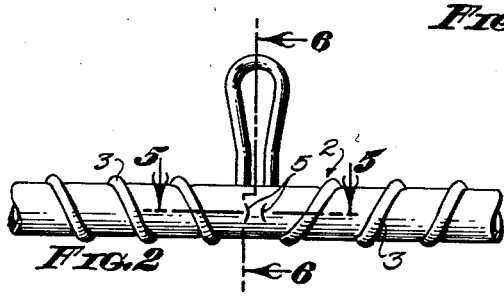
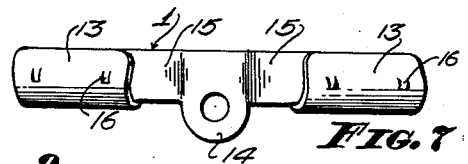
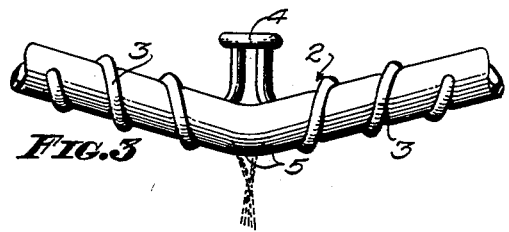
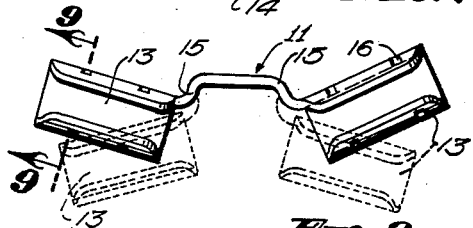
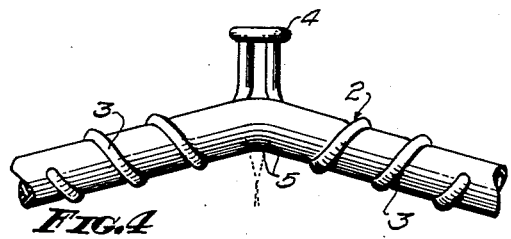
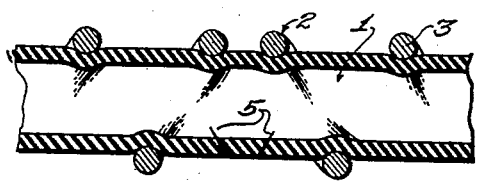
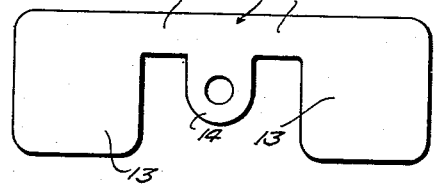
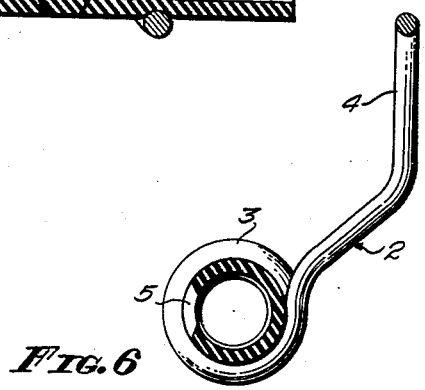
INVENTOR.
EDWIN J. HUNTER
BY Lloyd Spencer
ATTORNEY.

Patented Aug. 24, 1954

2,687,329

UNITED STATES PATENT OFFICE 2,687,329

IRRIGATION HOSE

Edwin J. Hunter, Riverside, Calif.

Application November 22, 1952, Serial No. 322,118

10 Claims. (Cl. 299—104)

My invention relates to irrigation hose, more particularly to an irrigation tube which incorporates a series of sprinkler means.

Included in the objects of my invention are:

First, to provide an irrigation hose wherein a flexible tube is provided with a series of sprinkler slits or orifices, and in the region of each of such slits, means is provided to hold the hose in a bent position, either convex or concave, to adjust the slit openings by stretching or compressing the hose and thus control the flow therefrom.

Second, to provide an irrigation hose of this class wherein means are provided adjacent each sprinkler slit to permit suspension of the irrigation tube from a wall or fence or provides means for anchoring the tube, in position on the ground to restrain the tube against the reaction force of the discharging water.

Third, to provide an irrigation hose which is intended to be slit in the course of installation to dispose the sprinkler slits or orifices along the hose wherever needed to direct the water most effectively.

Fourth, to provide an irrigation hose which is particularly inexpensive to manufacture and install.

With the above and other objects in view, as may appear hereinafter, reference is directed to the accompanying drawings, in which:

Figure 1 is a fragmentary elevational view of my irrigation hose showing a section of tubing hose and several outlet control members.

Figure 2 is an enlarged elevational view showing one of the control members and an adjacent section of tubing.

Figure 3 is a top view thereof showing the manner in which the control member and tube are bent to spread the sprinkler slits and provide a heavy spray or stream.

Figure 4 is a top view similar to Figure 3 showing the arrangement of the control member in order to provide a restricted spray.

Figure 5 is an enlarged fragmentary sectional view through 5—5 of Figure 2.

Figure 6 is an enlarged transverse sectional view through 6—6 of Figure 2.

Figure 7 is an elevational view of a modified form of outlet control member.

Figure 8 is a top view thereof.

Figure 9 is a sectional view thereof taken along the line 9—9 of Figure 8 showing the irrigation hose in place.

Figure 10 is a developed view of a blank from which the modified control member may be formed.

Reference is first directed to Figures 1 through 6. My irrigation hose here shown comprises a length of tubing 1 preferably of plastic material, or rubber, and a series of outlet control members 2.

Each outlet control member 2 is formed of soft or annealed wire, or other material which will hold to a shape in which it is bent. The control member includes two helical coil sections forming hose gripping elements 3. The pitch of the coil sections is such that the hose may be pressed between the convolutions until the coil members are wrapped about the hose as shown in Figures 2, 3, and 5.

The adjacent ends of the coil sections are joined by a loop 4 which extends upwardly and to one side of the coils. The loop 4 may serve to suspend the hose from a vertical wall or may receive nails or stake members for pinning the hose in place on the ground.

In the region between the coils 3 the hose is provided with one or more slits 5. If a pair of converging slits are cut, streams of water issuing from the hose therethrough impinge and form a spray.

Reference is now directed to Figures 7 to 10 inclusive. The modification of the control member designated 11, here shown is formed from a sheet metal blank 12 such as shown in Figure 10. The blank is provided with major end lugs which are bent into U-shaped cross section to form hose clamping or gripping elements 13 corresponding to the coils 3.

The gripping elements are joined to a central lug 14 by webs 15. The central lug is perforated to permit suspension or fastening of the control member. The webs 15 are sufficiently strong to hold the gripping elements 13 and the hose therein in any desired angular relation.

The hose is inserted by pressing it downwardly into the gripping elements which curve inwardly at their upper margins to retain the hose. In order to prevent twisting of the hose, which would shift the position of the discharge slit or slits, the gripping elements are provided with inwardly directed teeth 16 so disposed to resist rotation in either direction.

Operation of my irrigation device is as follows:

It is preferred to cut the slit or slits 5 at the time of installation so that an outlet may be provided precisely at each place desired; however, the irrigation hose may be slit at pre-selected regular intervals. In either case, at each outlet, a control member 2 or 11 is fitted on the hose so that the gripping elements 3 or 13 are disposed on opposite sides of the outlet.

The gripping elements are bent to produce the desired volume of discharge from the outlet. This is accomplished by forming a convex band in the hose to spread the slit or slits and to provide a large volume discharge; or by forming a concave bend to compress the slit or slits and provide a small volume discharge.

The irrigation device may be fastened by the loops 4 on a fence or wall so that the spray outlets may be directed toward an adjacent row of plants; or the irrigation device may be stretched along the ground in and around the plants and held in place by large nails or pegs driven into the ground through the loops.

Having thus described certain embodiments of my invention I do not desire to be limited thereto, but intend to claim all novelty inherent in the appended claims.

I claim:

1. An irrigation hose comprising: a flexible tube having a discharge orifice; and a pair of gripping elements embracing said tube on opposite sides of said orifice; means connectiong said elements and capable of being deformed and, when deformed, retain said elements in relative angular relation to stretch or compress said flexible tube in the region of said orifice thereby to open or close said orifice.

2. An irrigation hose comprising: a flexible tube adapted to be slit to provide a series of discharge orifices; and means embracing said tube in the region of each orifice, said means being bendable to hold said tube in a correspondingly bent position to place the region of said orifices under compression or tension thereby to constrict or open said orifices.

3. An irrigation hose comprising: a flexible tube adapted to be slit to form a discharge orifice; a pair of gripping elements embracing said tube on opposite sides of said orifice and connecting means joining said gripping elements and adapted to be deformed to hold said elements in angular relation thereby to compress or stretch said tube in the region of said orifice thereby to constrict or open said orifice; and means for anchoring said connecting means thereby to secure said tube in position against the reaction of water issuing from said orifice.

4. An irrigation hose, comprising: a flexible tube adapted to be slit to provide a series of discharge orifices; means connected to said tube in the region of each orifice for holding said tube in a bent position to expand or contract said orifice thereby to control the volume of water discharge from each orifice; and a securing member adjacent each means for securing said tube against the reaction of water issuing from said orifices.

5. An irrigation hose as set forth in claim 1, wherein: each of said gripping elements is a wire coil wrapped about the tube.

6. An irrigation hose as set forth in claim 1 wherein each of said gripping elements is a channel member of generally U-shaped cross section.

7. An irrigation hose as set forth in claim 3 wherein: each of said gripping elements is a wire coil wrapped about the tube and of slightly smaller diameter than the tube to restrain the tube against rotation within the coil.

8. An irrigation hose as set forth in claim 3 wherein: each of said gripping elements is a channel member of generally U-shaped cross section and projections are provided therein to engage and restrain the tube against rotation.

9. An irrigation hose as set forth in claim 1 wherein: each of said gripping elements is a coil of such pitch that the tube may pass between the convolutions of the coils to assemble said coil thereon; and said connecting member is a loop projecting laterally from the tube and constituting means for securing the tube against the reaction of water discharging from said orifices.

10. An irrigation hose as set forth in claim 1 wherein: each discharge orifice consists of at least one slit cut crosswise into the tube.

References Cited in the file of this patent
UNITED STATES PATENTS

| Number | Name | Date |
|---|---|---|
| 1,955,231 | Frederick | Apr. 17, 1934 |
| 2,095,170 | Conklin | Oct. 5, 1937 |